(12) United States Patent
Guo et al.

(10) Patent No.: US 7,747,249 B2
(45) Date of Patent: Jun. 29, 2010

(54) GSM/UMTS EMULATOR

(75) Inventors: Zihua Guo, Beijing (CN); Richard Yuqi Yao, Morris Plains, NJ (US); Jin Shi, Beijing (CN); Pung Pengyang Xu, Sammamish, WA (US); Steven Elliot, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/092,523

(22) Filed: Mar. 29, 2005

(65) Prior Publication Data

US 2006/0223522 A1  Oct. 5, 2006

(51) Int. Cl.
*H04W 24/00* (2009.01)

(52) U.S. Cl. .................. 455/423; 455/424; 455/425
(58) Field of Classification Search ........ 455/67.11–72, 455/423–425
See application file for complete search history.

(56) References Cited

U.S. PATENT DOCUMENTS

| 6,307,923 | B1* | 10/2001 | Bremer et al. | 379/106.08 |
| 6,584,107 | B1* | 6/2003 | Hunlich | 370/395.53 |
| 6,886,180 | B1* | 4/2005 | Sandberg et al. | 725/111 |
| 2004/0085941 | A1* | 5/2004 | Li et al. | 370/338 |
| 2004/0170149 | A1* | 9/2004 | Lee | 370/338 |
| 2004/0172231 | A1* | 9/2004 | Barbaresi et al. | 703/13 |
| 2004/0209612 | A1* | 10/2004 | Barberis et al. | 455/423 |
| 2005/0021760 | A1* | 1/2005 | Kim | 709/227 |
| 2006/0009157 | A1* | 1/2006 | Chiu | 455/67.11 |
| 2006/0025151 | A1* | 2/2006 | Karaoguz et al. | 455/455 |
| 2006/0171364 | A1* | 8/2006 | Bosch et al. | 370/338 |
| 2008/0161006 | A1* | 7/2008 | Ferrato et al. | 455/446 |

* cited by examiner

*Primary Examiner*—Patrick N Edouard
*Assistant Examiner*—Justin Y Lee
(74) *Attorney, Agent, or Firm*—Woodcock Washburn LLP

(57) ABSTRACT

A GSM/UMTS emulator is disclosed for emulating a real network so that certain device functionalities can be easily tested. The architecture of such a GSM/UMTS emulator may include a terminal PC and a server. The terminal PC runs the device (including a radio interface layer and a multiplexer). The server acts as the application server to emulate UMTS network performance. Such an emulator may enable testing of both control information and data applications.

13 Claims, 5 Drawing Sheets

GSM/UMTS EMULATOR

FIELD OF THE INVENTION

Generally, the invention relates to GSM/UMTS emulators. More particularly, the invention relates to systems for emulating a wireless connection between a GSM/UMTS mobile phone and the corresponding network over the Ethernet in a local environment.

BACKGROUND OF THE INVENTION

In order for a "WINDOWS MOBILE" platform to support GSM/UMTS networks, the functionalities of certain operating system (OS) modules should be tested and evaluated. Such modules may include Radio Interface Layer (RIL), Multiplexer (MUX), Telephony API (TAPI), SMS, etc. For example, before marketing a new mobile cellular device, it may be desirable to test the functionalities of the new design for GSM/UMTS, including RIL, MUX, TAPI, etc.

Typically, a real wireless network is required for such a testing. Real network testing has several limitations, however, such as unavailability, instability, high cost, hard to reproduce error, limited supported features, inconvenience, etc. Therefore, it would be desirable if a GSM/UMTS emulator were available to emulate the real network so that OS functionalities for GSM/UMTS support could be easily tested locally.

SUMMARY OF THE INVENTION

The invention provides a GSM/UMTS emulator to emulate the real network so that certain device functionalities can be easily tested. The architecture of the GSM/UMTS emulator may include a CEPC and a server. The CEPC runs the device (including RIL and MUX), and the server acts as the application server to emulate the UMTS network performance. An emulator according to the invention may enable testing of both control information and data applications.

DETAILED DESCRIPTION OF ILLUSTRATIVE EMBODIMENTS

Example Computing Environment

Figure 1:
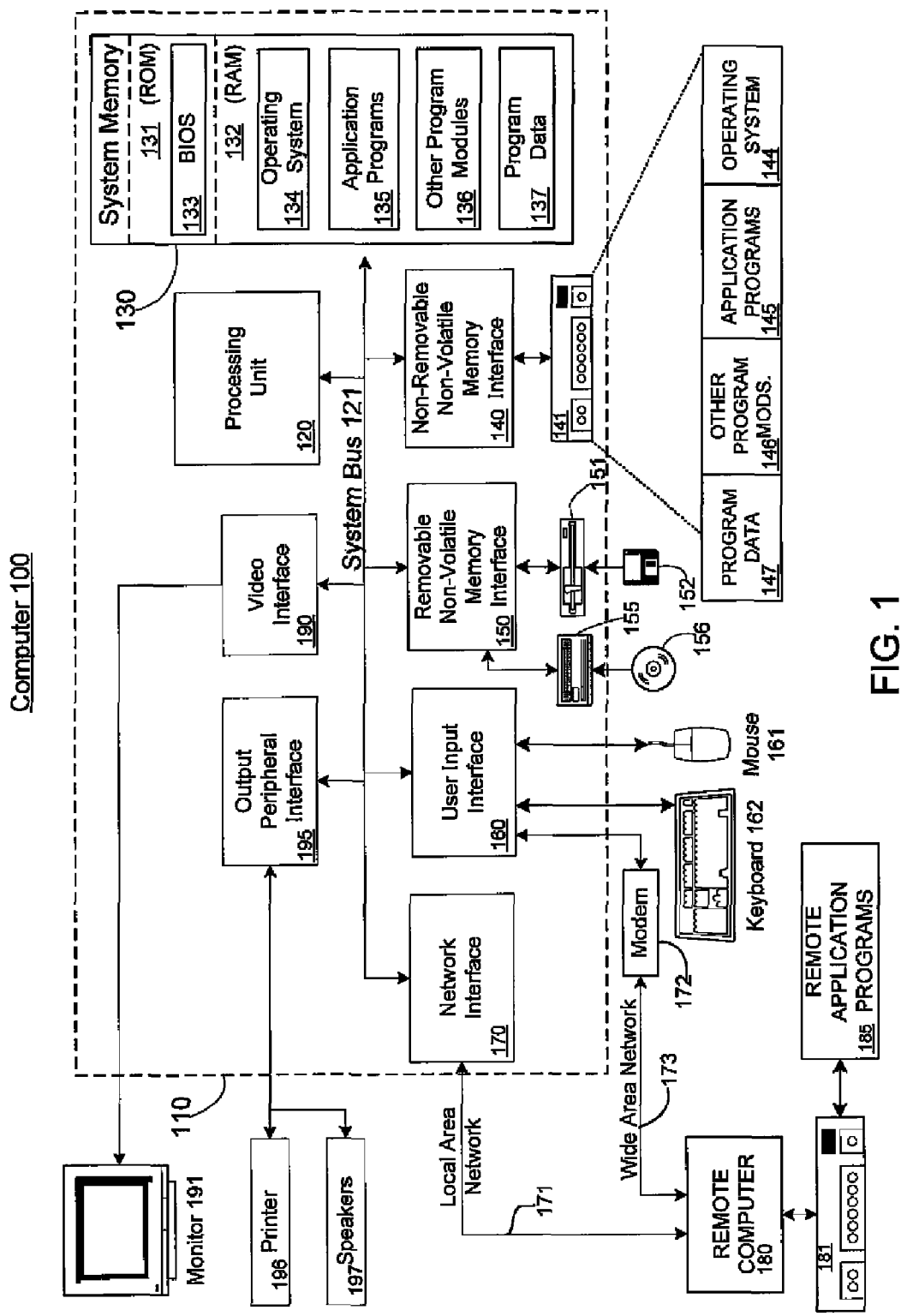
FIG. 1 is a block diagram showing an example computing environment in which aspects of the invention may be implemented.

FIG. 1 and the following discussion are intended to provide a brief general description of a suitable computing environment in which an example embodiment of the invention may be implemented. It should be understood, however, that handheld, portable, and other computing devices of all kinds are contemplated for use in connection with the present invention. While a general purpose computer is described below, this is but one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120*a-f* through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

GSM/UMTS Emulator

Figure 2:
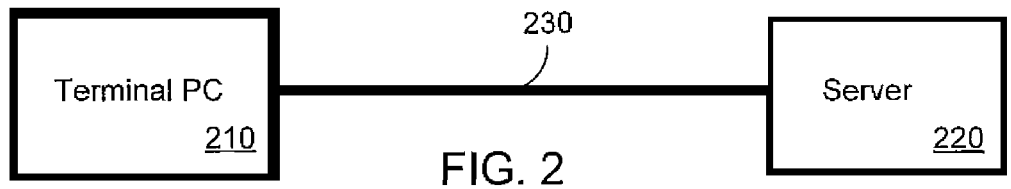
FIG. 2 is a block diagram of an example GSM/UMTS emulator environment.

A system according to the invention may emulate the wireless connection between a GSM/UMTS mobile phone and the corresponding network over the Ethernet in a local environment. Based on a typical architecture of a wireless system, the GSM/UMTS emulator system may include a terminal PC 210 and a server 220, as shown in FIG. 2. The terminal PC 210 may emulate the terminal equipment (TE) part of the mobile phone, and may run a Windows Mobile based Operating System (OS).

The server 220 may emulate the mobile terminal (MT) and the application server, which may be, for example, a video server, web server, dial-up server, etc. The server 220 may also include a point-to-point protocol (PPP) server and a MUX that corresponds to the MUX in terminal PC. A generic Wired and Wireless Network Emulator (WiNE) that is provided by Microsoft may be installed in the server to emulate the GSM/UMTS network performance. The WiNE is a driver that can influence a packet's behavior according to some user-defined profile or configurations which actually emulates the effect of network to a packet, such as bandwidth restriction, packet delay and loss. It may be used to process both the incoming packets from the terminal PC 210 and the outgoing packets to the terminal PC 210 so that the basic GSM/UMTS network behaviors are simulated.

Figure 3:
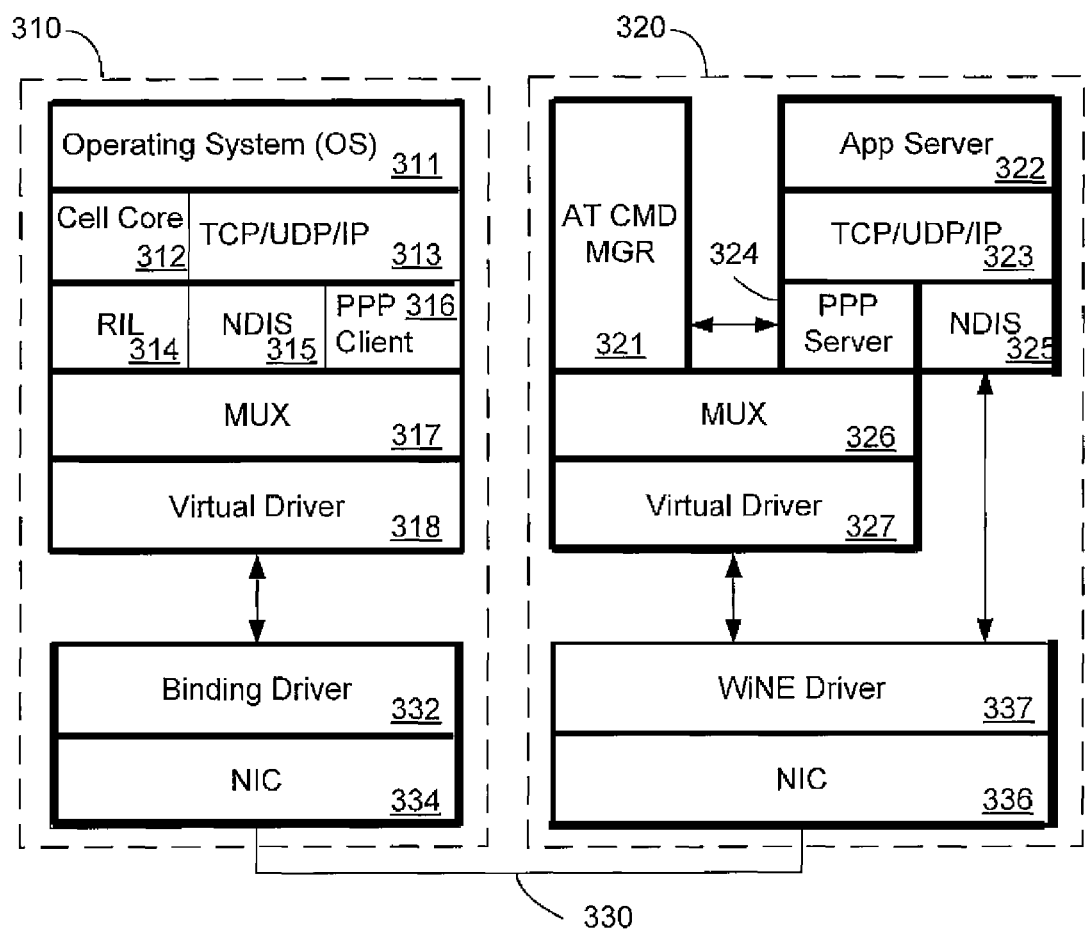
FIG. 3 is a block diagram of an example architecture of a GSM/UMTS emulator according to the invention.

FIG. 3 is a detailed block diagram of an example architecture of a GSM/UMTS emulator according to the invention. As shown, the terminal PC 310 may run a Windows Mobile based Operating System 311 and CellCore 312 (CellCore is a strategic wireless architecture for Widows Mobile platform.). The terminal PC 310 may include a TCP/UDP/IP driver 313, a radio interface layer (RIL) 314, an NDIS 315, a PPP client 316, a MUX 317, and a virtual driver 318. The terminal PC 310 may also include a binding driver 332 and a network interface card 334 for communication with the network 330.

The server 320 may include an AT command manager 321, an application program server 322, a TCP/UDP/IP driver 323, a PPP server 324, an NDIS 325, a MUX 326, and a virtual driver 327. The server 320 may also include a WiNE driver 338 and an NIC 336 for communication with the network 330.

The MUXs 317, 326 may be based on 3GPP TS 27.010 and may expose multiple virtual ports from the upper layer point of view over just one physical port between the TE and the MT. These ports may separately handle data, command, voice, etc.

The virtual drivers 318, 327 and binding driver 332 are for redirecting the packet down from the MUX 317 to the NIC 334, 336 and the packet from the NIC 334, 336 to the MUX 317, 326. The WiNE driver 338 in the server side may also include binding driver functionality. In addition, it may process incoming and outgoing packets. In particular, it may delay a packet for any configured time. It may also drop a packet with a configured packet loss probability. Note that the WiNE 338 may be binding to the Ethernet NIC 336, and both emulator packets and normal Ethernet packets may go through the WiNE. In order to distinguish the packets from/to emulator and normal Ethernet signaling packets, a header may be added in the Ethernet packet header before the packet leaves the NIC 336.

There are two kinds of supports for IP data between the mobile station and the UMTS network. The first is through the PPP 316, 324 and the other is through the NDIS interface 315, 325. The PPP client 316 in the terminal PC 310 may be used to initiate the PPP connection between the PPP server 324 in the MT 320 or the PPP server in a remote server (not shown). There may be two modes for PPP connections: one is the PPP server 324 in the MT 320, where the protocol loop is locally between the MT 320 and the TE 310; the other is the PPP server in GGSN and the PPP protocol loop is between the TE and the network server. With the architecture shown in FIG. 3, both modes can be emulated.

In the first case, because the MT 310 and TE 320 are connected via a local link, e.g., a serial port, and the PPP packets go through two MUX ports, the speed is usually limited by the MUX standard and the local link used, say, 128 kbps. At the same time, the frame transmission error is determined by the local link and the MUX mode. In this case, the WiNE driver 338 will emulate the behaviors of this local link instead of wireless link.

In the second case, because the PPP client 316 and PPP server 324 are located in the mobile station and the network separately, and their connection needs to go through the wireless link, the WiNE driver 338 will mainly emulate the behaviors of the wireless link, e.g., data rate, packet loss rate, delay, etc.

The NDIS-based IP data may always go through the wireless channel. Thus, similar to the second case in PPP-based IP connection, the NDIS-based IP packets will be processed by the WiNE driver, which may include delay, packet loss, bandwidth restriction, etc.

The AT Command Manager 321 may handle the AT command sent from the TE 310 to the MT 320. The functionalities supported may include: checking the syntax correctness of the AT command and sending a response, maintaining the corresponding state (e.g., registration or not), etc. Similar to the PPP packet between the MT 320 and the TE 310, the AT command between the MT 320 and the TE 310 will also be subject to error due to the local link, e.g., serial link. Thus, the WiNE driver 338 will also emulate this kind of error.

The other elements of the emulation system depicted in FIG. 3 perform according to their normal operations, which are well-known to those skilled in the art and, therefore, need not be described in detail herein.

Figure 4:
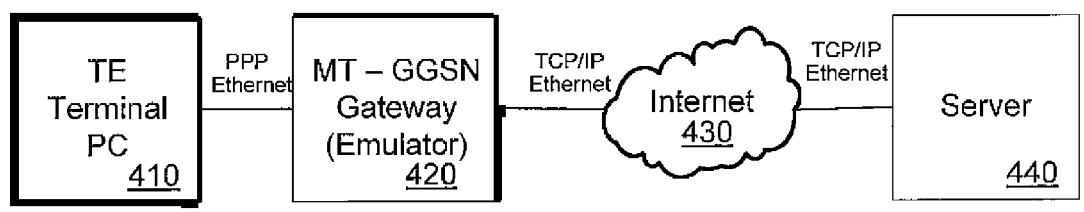
FIG. 4 is a block diagram of another example GSM/UMTS emulator environment.

FIG. 4 is a block diagram of another example GSM/UMTS emulator environment. As shown in FIG. 4, the emulator 420 may interact with the TE 410, representing the mobile network, from MT to GGSN. In order to simulate radio error, the emulator 420 should also be integrated (via the Internet 430, for example) with WiNE (in the server 440, for example).

In such an embodiment, the emulator may be designed to support the data connection. Note that not all AT commands need to be supported. For example, the focus may be on AT commands needed for data channel, especially those of QoS, which could be used to adjust WiNE settings.

There may be two network environments for data connection, IP-based and PPP-based transparent. In case of the IP-based services, the PPP server may be deployed in the MT so that the PPP connection will not be affected by the radio error, but the data transfer will. In the case of PPP-based transparent services, the PPP server is deployed in GGSN. Therefore, the PPP connection may be fail due to the radio error. Preferably, the design of the emulator should be compatible with both conditions.

Figure 5:
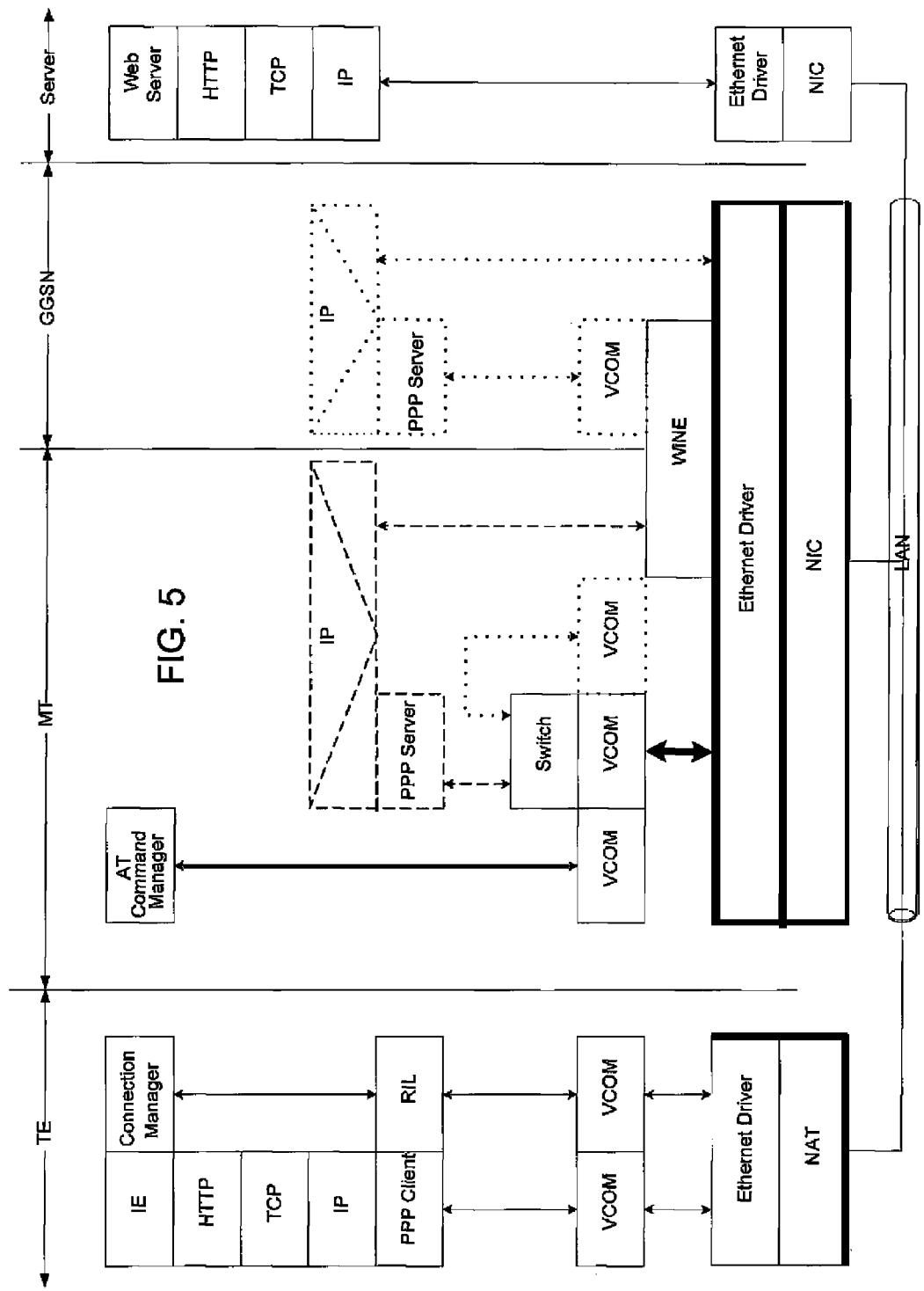
FIG. 5 is a block diagram of another example architecture of a GSM/UMTS emulator according to the invention.

According to the protocol stacks of the two scenarios, the architecture of the emulator must be a general one to support both conditions. An overview of this architecture is given in FIG. 5. As shown in FIG. 5, the terminal equipment (TE) emulator may include a PPP client and a connection manager that communicates with a radio interface layer (RIL). The RIL and PPP client each may communicate with a respective virtual driver (VCOM). VCOM may communicate with an Ethernet driver. A NAT (Network Address Translation) may be provided to couple the TE emulator to a local area network (LAN). The TE emulator may also include a web browser (IE), as well as HTTP, TCP, and IP drivers.

A server may be coupled to the LAN via an Ethernet driver and a network interface card (NIC). The server may include a web server, as well as HTTP, TCP, and IP drivers.

A mobile terminal (MT) emulator and GGSN (Gateway GPRS Support Node) emulator may also be coupled to the LAN via an Ethernet driver and a network interface card (NIC). The MT emulator may include an AT command manager that communicates with a virtual driver (VCOM). A control channel may start from the connection manager and end at the AT command manager. Over this channel, all the AT commands between TE and MT may be transmitted, parsed, and operated so that the TE may "feel" there exists a mobile network.

The data channel may consider two different scenarios. As shown in FIG. 5, the dashed modules and lines are related to IP-based services, while the dotted modules and lines compose the data channel for PPP-based transparent services. The PPP modules have to bind with a COM device so that there is a certain kind of virtual driver upon the Ethernet, referred to herein as a VCOM driver, providing a COM interface to the upper layer. In order to alternate the scenario, there can be a switch module to control the data flow according to some environmental settings.

Generally, the VCOM driver may have any or all of the following characteristics: 1) the driver works like a COM port, which can support COM events; 2) TCP or UDP may be used to connect other VCOM drivers; 3) one VCOM port connects to none or only one other port; 4) no connection to real COM ports; 5) there can be multiple instances of the driver in a machine, each emulates one COM port.

Figure 6:
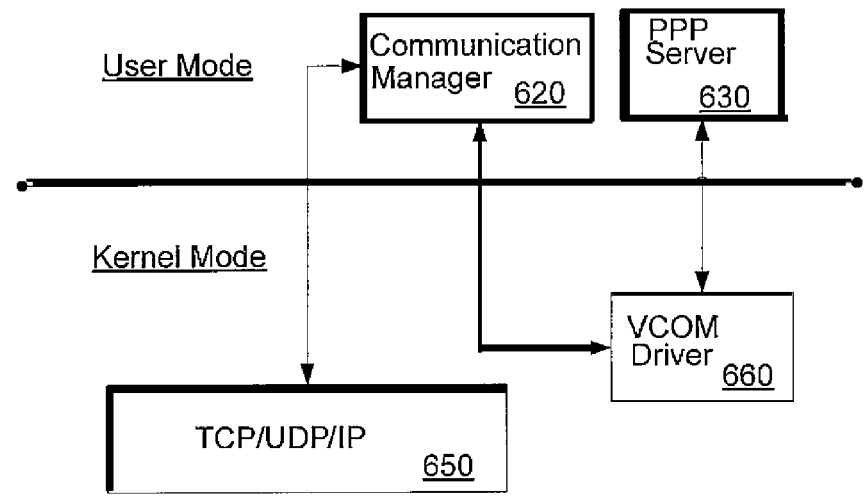
FIG. 6 is a block diagram showing a VCOM driver.

In order to obtain more flexibility, the VCOM driver may be designed as shown in FIG. 6. The general idea of this driver is to encapsulate the PPP frame into an IP packet. Each instance of this VCOM will have a unique port number thus they will be distinguished easily.

The VCOM driver 660 may collect read/write requests from a COM application 630, which may be a PPP server, for example. The communication manager 620 may get the actual data from IP packets 650 and transfer such data to the VCOM driver 660. It should be understood that two VCOM ports can be connected regardless of whether they are on the same machine.

The top interface of the VCOM driver may be a virtual single COM port. As an alternative solution of MUX, there can be multiple VCOMs in a system. The bottom interface of the VCOM driver may be a general IP packet. That is, an IP-over-PPP-over-IP communication may be applied. In addition, the critical module of the VCOM driver is the Communication Manager. This is a system service and it maintains all the ports available for the VCOMs to use. Generally, the VCOM will interact with this service by system events.

Another consideration is to integrate with WiNE. Actually, because WiNE is able to process passing data by some filter such as the port number, all the VCOMs can be setup over WiNE. However, the data flow from different ports should be distinguished and then scrambled. Accordingly, the implementation of emulator may have a simpler design as shown in FIG. 7.

Figure 7:
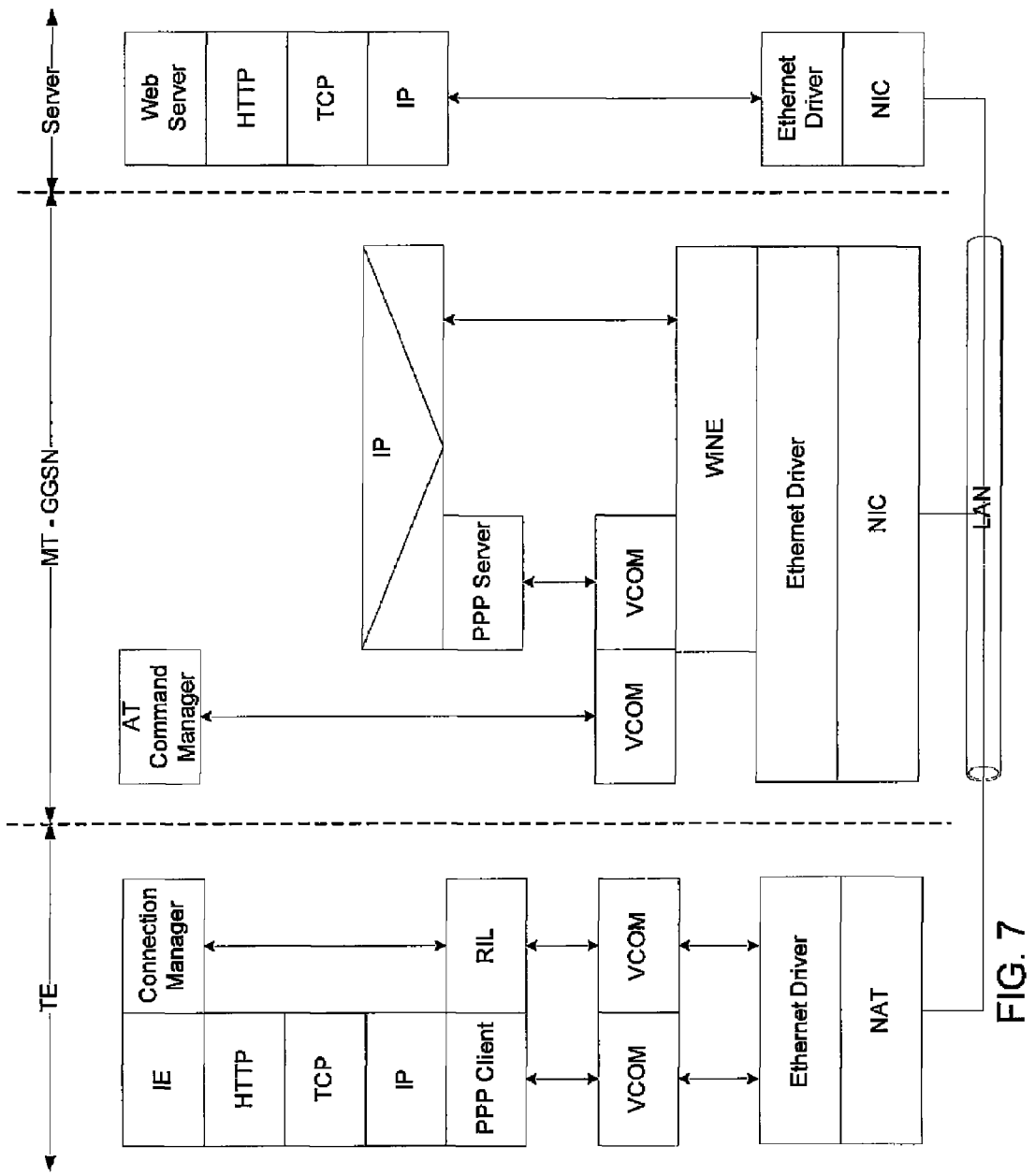
FIG. 7 is a block diagram of a simplified architecture for a GSM/UMTS emulator according to the invention.

In the design depicted in FIG. 7, there is only one PPP server, and WiNE should be carefully configured. When running the IP-based services, WiNE should add extra process onto the IP packets. When running the PPP-based transparent services, WiNE should scramble the packets sent from/to the VCOM binding with the data channel, flagged by the specified port number.

Thus, there have been described systems for emulating a wireless connection between a GSM/UMTS mobile phone and the corresponding network over the Ethernet in a local environment. It should be understood that the invention has been described herein with respect to certain example embodiments, and that other embodiments of the invention may fall within the scope of the following claims.

What is claimed:

1. An emulation system for emulating a wireless communication network including a mobile phone and a mobile terminal, the emulation system comprising:
   a terminal PC that emulates the mobile phone; and
   a server coupled to the terminal PC via a local link, wherein the server emulates the mobile terminal, and the server includes a performance driver that emulates GSM/UMTS network performance including emulation of a plurality of connection modes for the same type of communication between the mobile terminal and GSM/UMTS network, wherein:
   the terminal PC includes a multiplexer and a point-to-point protocol (PPP) client, and the server includes a PPP server and a multiplexer that corresponds to the multiplexer in the terminal PC; and
   each of the terminal PC and the server includes a respective network interface card and one or more drivers for redirecting packets between the multiplexers and the network interface cards.

2. The emulation system of claim 1, wherein the performance driver influences a behavior of a packet according to a user-defined profile.

3. The emulation system of claim 1, wherein the performance driver influences a behavior of a packet according to a configuration that emulates an effect of the network to the packet.

4. The emulation system of claim 3, wherein the effect of the network is at least one of bandwidth restriction, packet delay, and packet loss.

5. The emulation system of claim 1, wherein the performance driver processes incoming packets from the terminal PC and outgoing packets to the terminal PC to simulate one or more GSM/UMTS network behaviors.

6. The emulation system of claim 1, wherein the terminal PC runs an operating system that supports mobile communications.

7. The emulation system of claim 1, further comprising an application server.

8. The emulation system of claim 7, wherein the application server is at least one of a video server, a web server, and a dial-up server.

9. An emulation system for emulating a wireless communication network including a mobile phone and a mobile terminal coupled via a wireless link, the emulation system comprising:
   a terminal PC that emulates the mobile phone; and
   a server coupled to the terminal PC via a local link, wherein the server emulates the mobile terminal and includes a performance driver that emulates:
   behavior of the local link;
   behavior of the wireless link; and
   GSM/UMTS network performance, wherein the system supports IP data between the mobile terminal and a UMTS network through a point-to-point protocol.

10. The system of claim 9, wherein the system supports the IP data through an NDIS interface.

11. The system of claim 9, wherein the system emulates a PPP connection mode having a protocol loop via the local link between the mobile terminal and the terminal PC.

12. The system of claim 9, wherein the system emulates a PPP connection mode having a protocol loop via the wireless link between the terminal PC and a network server.

13. An emulation system for emulating a wireless communication network including a mobile phone and a mobile terminal coupled via a wireless link, the emulation system comprising:

a terminal PC that emulates the mobile phone, the terminal PC having a connection manager;

a server coupled to the terminal PC via a local area network, wherein the server includes a performance driver that emulates GSM/UMTS network performance;

an emulator coupled to the terminal PC and to the server via the local area network, wherein the emulator emulates the mobile terminal and includes an AT command manager, a control channel over which AT commands between the connection manager and the AT command manager are transmitted, parsed, and operated so that the wireless network is emulated to the terminal PC; and a virtual driver upon an Ethernet that provides a communication interface to an upper layer, wherein:
   the control channel starts from the connection manager and ends at the AT command manager; and
   the virtual driver encapsulates a PPP frame into an IP packet.

* * * * *